S. N. DALMANT.
WATER MILL.
APPLICATION FILED JULY 24, 1919.
1,342,100.
Patented June 1, 1920.
2 SHEETS—SHEET 1.
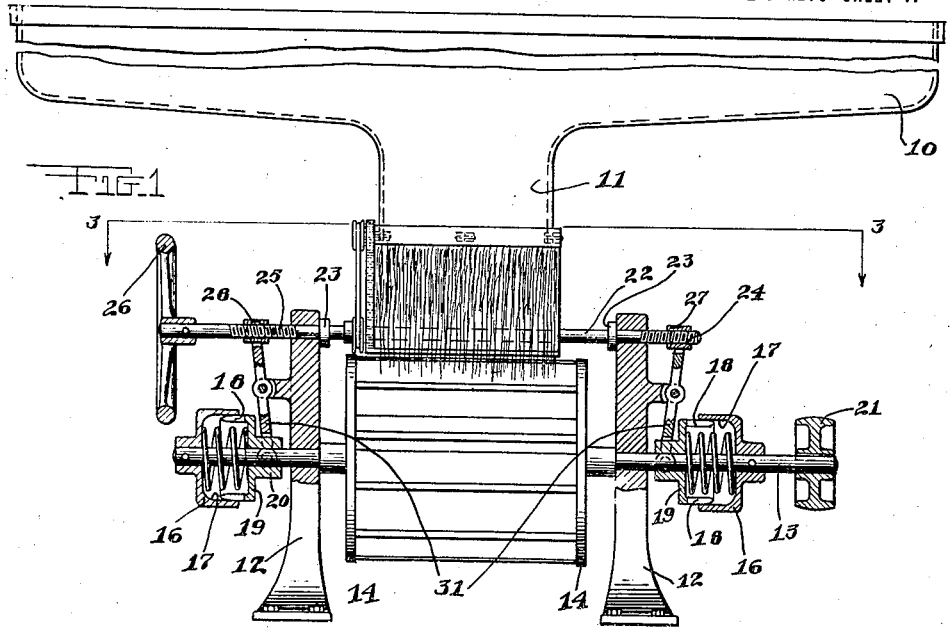
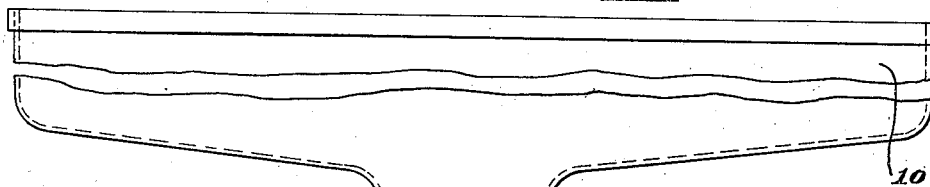
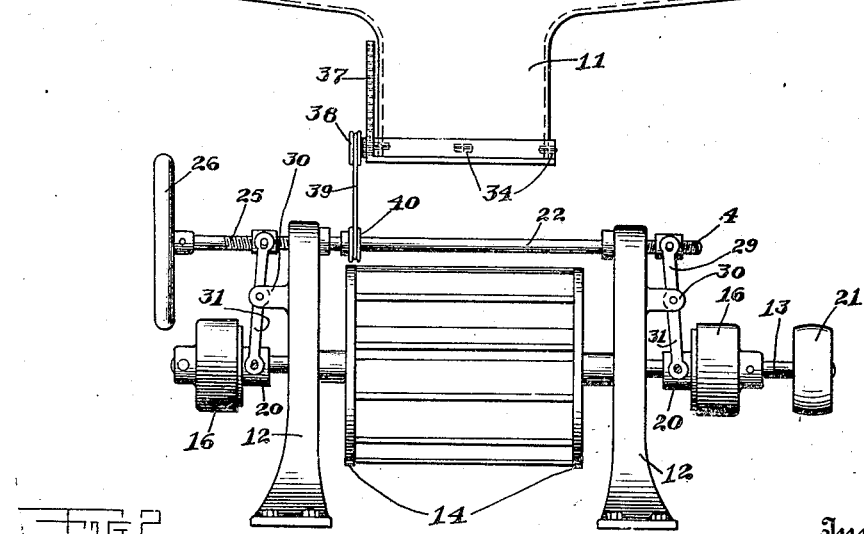
Inventor
Sam N. Dalmant
By Alfred Tschinkel
Attorney

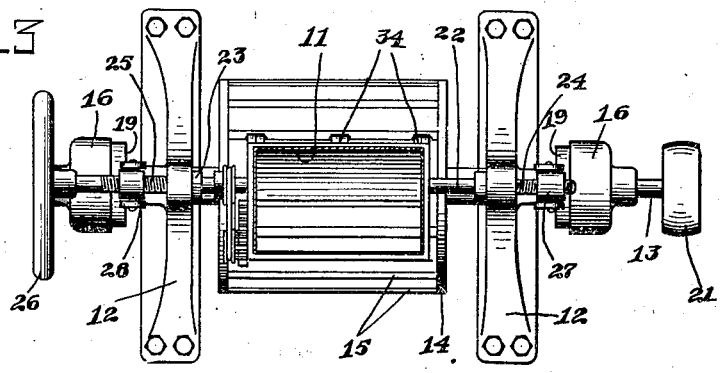
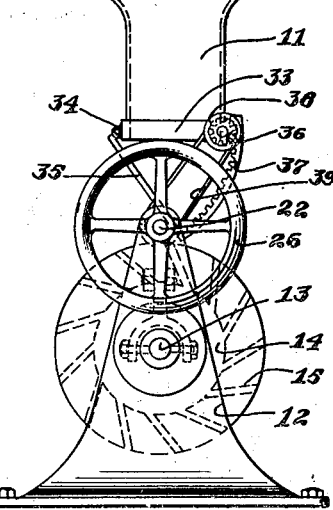

UNITED STATES PATENT OFFICE.

SAM N. DALMANT, OF WETONKA, SOUTH DAKOTA.

WATER-MILL.

1,342,100. Specification of Letters Patent. Patented June 1, 1920.

Application filed July 24, 1919. Serial No. 313,053.

*To all whom it may concern:*

Be it known that I, SAM N. DALMANT, a citizen of Russia, residing at Wetonka, county of McPherson, and State of South Dakota, have invented certain new and useful Improvements in Water-Mills, of which the following is a specification.

This invention has as its object the provision of a water mill combined with control methods of a novel nature, the object being to provide a braking device coincidently operative with closing the water current so that the mill may be stopped without loss of time.

This and other objects are attained by the novel construction and combination of parts hereinafter described and shown in the accompanying drawings, forming a material part of this disclosure, and in which—

Figure 1 is a front elevational view showing a water mill made in accordance with the invention, parts being shown in section in order to disclose the interior construction, and the mill shown in action.

Fig. 2 is a similar front elevational view of the same, the parts being shown in a closed or inoperative position.

Fig. 3 is a top plan view and horizontal section, the section being taken on line 3—3 of Fig. 1, and Fig. 4 is a side view of the mill.

Referring to the drawings in detail, a conventional reservoir is indicated by the numeral 10, the same being adapted to receive or contain a quantity of water which is directed downward through the sluiceway 11, to the mill wheel when in operation. The mechanism comprises a pair of standards 12, secured to a suitable foundation and arranged in spaced alinement.

Rotatably mounted in the standards 12 is a shaft 13, upon which, between the standards is secured a bucket wheel 14, containing a plurality of tangential mounted buckets 15, while upon the extending ends of the shaft 13 are affixed a pair of oppositely disposed solid heads 16, containing bored cylindrical recesses 17, receptive of a plurality of spring prongs 18 formed with a disk 19, the hub 20 of which is slidable upon the shaft 13, these elements being normally pressed apart by coiled compression springs engaged therebetween.

On one of the extreme ends of the shaft 13 is secured a driving pulley 21, by which rotary motion may be communicated to other mechanisms as desired.

Mounted in the upper part of the standards 12 is another shaft 22, provided with collars 23, adjacent to its bearings, one of the ends of the shaft having formed upon it a left hand screw thread 24, a similar but right hand screw thread 25 being formed on the opposite end of the shaft, which continuing farther outward, has secured to it an operating hand wheel 26.

Engaged with the respective threads 24 and 25, are cylindrical nuts 27 and 28, pivotally connected in the upper ends of forked lever arms 29, pivoted midway in their length on brackets 30 extending out from the sides of the standards 12, while the inner, forked ends 31 of the levers partially encircle the hubs 20, to which they are connected in such manner that as the hand wheel 26 is operated, rotary motion is communicated to the shaft 27, moving the nuts 27 and 28 either to or from each other according to the direction the shaft 22 is turned, thereby transmitting a sliding motion to the brake elements 18–20 inclusive, forcing them into engagement within the recesses 17, tending to arrest the rotary motion of the shaft 13, or release these clutch parts so that the shaft is free to operate.

Secured to the marginal lower edge of the sluiceway 11, is a frame 33, on one side of which is connected by a hinge 34, a gate or shutter 35 arranged in such manner as to close the sluiceway 11 when raised, or to permit the water to strike the bucket 15 when in a lowered position.

Fixed upon the upper side of the frame 33 so as to rotate thereon, is a pinion 36, engaging with an arcuate rack 37, attached at its opposite end to the outer edge of the shutter plate 35, and fixed to the side of the pinion 36 is a pulley 38 over which is trained a belt 39, the belt passing over another pulley 40, secured upon the shaft 22 so that as the hand wheel is operated, not only are the brakes actuated, but the shutter or gate 35 also moved so as to close or open the sluiceway 11.

From the foregoing it will be seen that a device has been described by which the water delivered upon the bucket wheel may be controlled in accordance with requirements, and that simultaneously with opening or closing the passage through which the water descends to the bucket, a brake may be applied thus controlling the mechanism in an effective manner.

I claim—

1. In a bucket wheel, the combination with a pair of standards, a shaft journaled transversely therein, and a bucket wheel mounted on said shaft, of a sluiceway adapted to deliver water to said bucket wheel, a gate hingedly engaged with said sluiceway, one or more friction heads secured upon said shaft, sliding elements on said shafts engaged with said friction heads, levers arranged to operate said sliding elements, means for operating both of said levers simultaneously, and means combined therewith for actuating said gate.

2. In a water mill, the combination with a pair of vertical standards, a transverse shaft journaled therein, a bucket wheel fixed upon said shaft between said standards, and a sluiceway arranged over said bucket wheel, of a hinged gate controlling the opening through said sluiceway, an arcuate rack secured to said gate, a second shaft journaled parallel above the first named shaft, said second shaft having right and left hand threads at its respective ends, nuts engaged with said threads, levers actuated by said nuts, slidable brake elements engaged on the first named shaft, concave brake heads fixedly engaged upon said shaft, said sliding elements being actuated by said levers operated through said nuts, and means for moving said rack simultaneously when operating said nuts whereby the sluiceway may be closed and the friction brakes applied to the first named shaft.

In testimony whereof I have affixed my signature.

SAM N. DALMANT.